Figure 2:
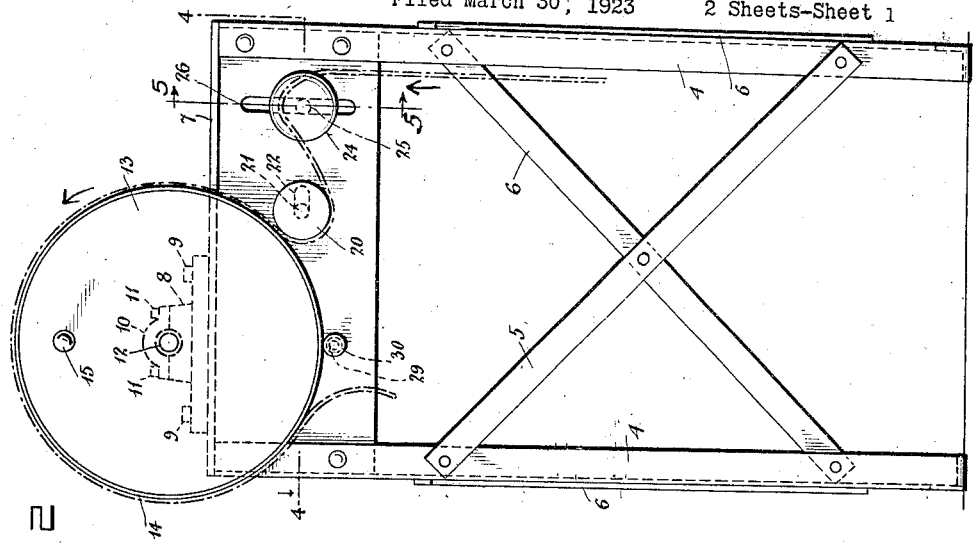

Aug. 10, 1926.

W. MILLER

SAUSAGE CASING MEASURING DEVICE

Filed March 30, 1923      2 Sheets-Sheet 1

1,595,907

Inventor
William Miller,
By
Attorney

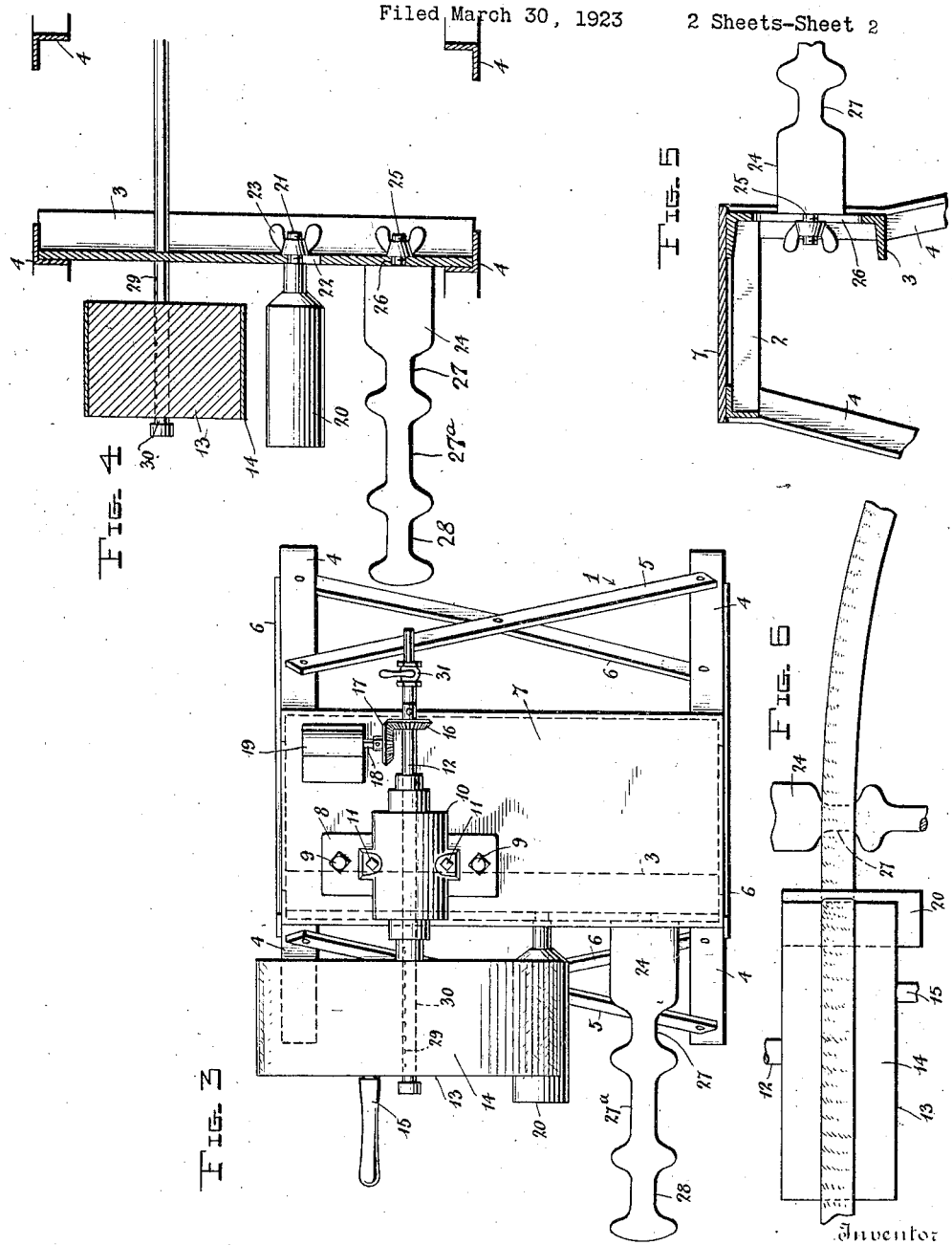

Patented Aug. 10, 1926.

1,595,907

UNITED STATES PATENT OFFICE.

WILLIAM MILLER, OF KANSAS CITY, KANSAS.

SAUSAGE-CASING-MEASURING DEVICE.

Application filed March 30, 1923. Serial No. 628,875.

This invention relates to a sausage casing measuring device and has for its general object the provision of practical and accurate means for taking the lineal measure of lengths of casing and computing the measurements thus taken.

Another object of the invention is a construction in which the measuring element is itself the means for bringing successive portions of the casing into measuring relationship with said element.

Still another object of the invention is the construction of a measuring device having a rotary measuring element for frictionally engaging the casing to feed the latter past said measuring element, and an adjustable tensioning means for said casing for stretching the latter and for imparting the proper tractive adherence of the casing to said measuring element to prevent slippage.

The sausage casing, in the collapsed form in which it is measured, is a flat strip, curvilinear in the plane of its width, and therefore having one edge shorter than the other. In order to be passed over the face of the rotary measuring element, the casing must be stretched into an approximately rectilinear shape in which both edges are substantially of the same length, that is to say the shorter edge must be stretched until it substantially equals the length of the longer edge. Now, the sausage casing when stuffed, assumes the form of a curved tube. Its length is not the length of either the long side or short side of the casing but the length of the middle or median line running longitudinally through said curved tube. Therefore, in measuring the flat casing which has been stretched to the length of the long edge it is necessary to provide means for determining from this measurement, the median length of the casing before being stretched. Wherefore, another object of the invention is to construct the measuring element with a measuring surface having a length in excess of the standard unit which it purports to represent, by an amount equal to that by which a measured unit of the stretched casing exceeds the median length of an unstretched unit.

With the above and other objects in view, my invention consists in the improved sausage casing measuring device illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:—

Figure 1:
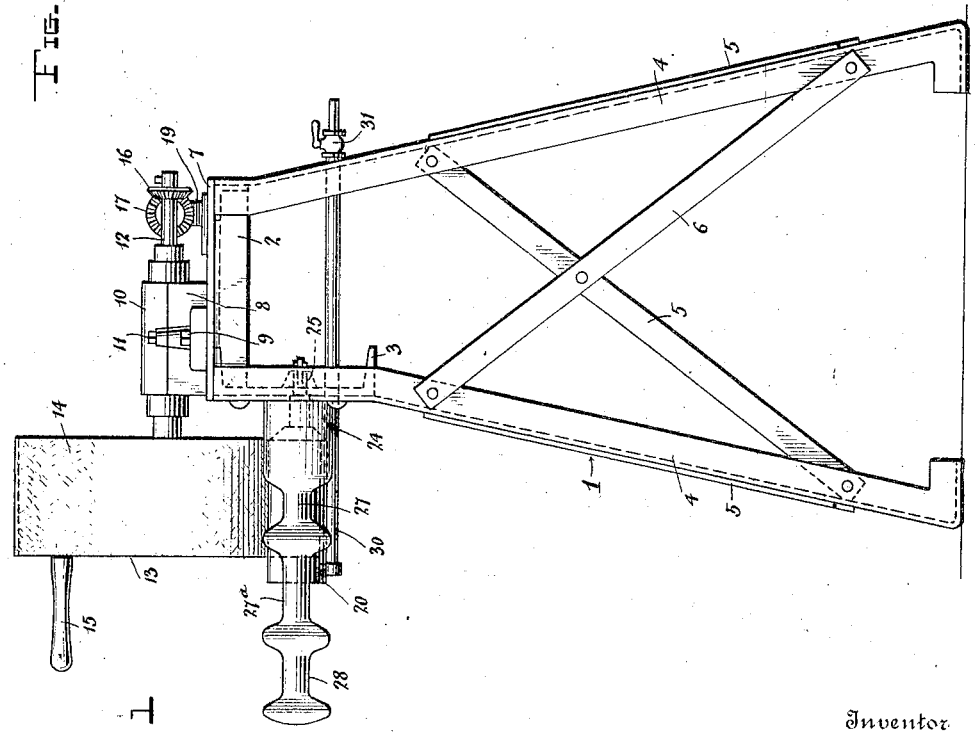

Figure 1 is an end elevation of the device.
Figure 2 is a side elevation.
Figure 3 is a plan view.
Figure 4 is a transverse section taken along the line 4—4 of Figure 2, the measuring element, the tensioning means, and the means for adjustably securing same in the frame being shown in plan.
Figure 5 is a section on the line 5—5, Figure 2, showing the vertical adjustment of the guiding arm.
Figure 6 is a plan view of the measuring element showing a portion of the casing resting thereupon and illustrating the curvilinear form of said casing.

Referring now in detail to the several figures, the numeral 1 represents, in general, a stand or support, as to which no claim of invention is made, but which, for illustrative purposes, may be defined as constructed of a rectangular frame, three sides of which are constituted by the angle irons 2, the fourth side being formed of a deep channel 3. This frame is carried upon supports 4 which may be of angle iron and are here shown as inclined to the vertical at opposite sides of the measuring device, affording a wide and stable base of support. Intersecting diagonal members 5 and 6 are shown, secured at their ends to the supports 4 and holding the latter in rigid relation. A plate 7 is secured to the top of the rectangular frame, upon which is fixed a bearing block 8 by means of the bolts 9, or other equivalent fastening devices. The bearing block has a removable cap 10 adapted to be bolted in place by the securing means 11, said block and cap embracing between them a horizontal cylindrical bearing within which the shaft 12 rotates. (Said shaft is reduced at its opposite ends.) To one end the measuring element 13 is secured, being constituted by a cylindrical drum which may be made of wood, aluminum or any other appropriate material and which is preferably covered by a frictional facing 14 such as canvas. Said measuring element may be rotated by suitable means such as the handle 15. On the opposite end of the shaft 12 is a spur-gear 16, meshing with a complementary spurgear 17, on a counter shaft 18, which forms part of the mechanical counting or computing mechanism 19. When the measuring element 13 is rotated by means of the handle 15, the number of revolutions is counted by said computing mechanism.

The frictional surface 14 upon the measuring element 13 is designed to engage with the sausage casing, to cause successive portions of the latter to pass over the measuring element as the latter is rotated, and the accuracy of the measuring device depends upon the condition that there shall be no slippage between said casing and the measuring element. To this end tensioning means is provided by which not only is retardative force applied to the casing for the purpose of increasing its pressure against the friction surface of the measuring element, but the casing is made to embrace a greater or less extent of the circumference of the measuring element, its adherence to the friction surface thereof being thereby varied according to requirements. The tensioning means also serves the important purpose of stretching the casing, which is normally in the form of a curved strip, sufficiently to render it rectilinear or almost rectilinear in shape as it passes over the surface of the measuring element. The tensioning means consists primarily of a roller 20, which is preferably of wood, mounted upon a pin 21. This pin is provided with a reduced portion passing through a slot 22 in the channel member 3 and is provided with a wing nut 23 for clamping said pin in any adjusted position within said slot. The wing nut is only one of many equivalent adjusting securing means which may be substituted therefor without departing from the spirit of the invention. The tensioning means also includes the guide-bar 24 which extends outwardly from a channel member 3, being formed with a reduced portion 25 extending through a vertical slot 26 in said channel member and being secured in adjusted position therein by means which may be similar to that employed for securing the pin 21. The guide-bar 24 is preferably non-rotatable and is formed with a dep circumferential guiding groove 27 adjacent the measuring element 13, and other grooves 27ª and 28 at its outer portion which are adapted for the festooning of portions of the sausage casing as they are drawn from the container in which they are packed, preparatory to being fed to the measuring device.

The lengths of casing vary from three to thirty or more feet. In operation, one of the casings is lifted from the container and looped over the guide-bar 24 within the recess 27, under the roller 20 and over the measuring element 13, the free end thereof being brought adjacent a zero line upon said measuring element. If the casing is very long, the portion which hangs from the guide-bar 24 is looped over the guide-bar in festoons, the object being to avoid undue strain upon the casing which might result from pulling it directly from the packed container. Upon rotation of the measuring element 13 the casing should adhere frictionally without slippage to the surface 14 thereof and be drawn along between it and the surface of the tensioning device 20. Should there be slippage, the tension is either too great, or not enough and the same may be regulated by adjusting the pin 21 of the roller 20 or the reduced portion 25 of the guide-bar 24, or both, respectively in the horizontal and vertical slots in which they are mounted. The effect of moving the roller 20 closer to the measuring element 13 is to increase the extent of area of the casing in effective frictional engagement with the measuring element. Moving said roller to the right (Fig. 2) or away from said measuring element reduces the area of engagement. Moving the guide-bar 24 in an upward direction makes the change in direction of movement of the casing around the roller 20 more abrupt, increasing the tension on said casing and consequently its frictional pressure upon the surface of the measuring element. Lowering said guide-bar has the opposite effect. In starting the device the end of the casing may be held at the zero mark with the finger until the measuring element has revolved a sufficient distance to permit the casing to be carried along, automatically, solely through frictional adherence.

The sausage casing is fed through the measuring device in flat form and it is inherently curvilinear in shape in the plane of its width, one edge of the flat casing being therefore shorter than the other. In its passage past the tensioning device the casing is stretched sufficiently to bring it to approximately a rectilinear shape, that is to say the short edge of the casing is stretched until it is substantially equal in length to the long edge. It is a well known fact that, when the sausage casing is stuffed, it assumes the form of a curved tube, the length of which is that of the median line running longitudinally through said tube and not the length of either the long or short side of the casing. Therefore the measurement of the stretched casing by the measuring element 13 would, in the absence of compensating means, give a fictitious measurement of the length of the casing. Compensation, however, is provided for by increasing the circumference of the measuring element beyond that of the unit of measure which it purports to represent, by an amount equal to that by which a measured unit of the stretched casing exceeds the median length of a unit of the unstretched casing. For instance, if the measuring element 13 is intended to measure in terms of yards, its circumference is made $36\frac{5}{16}$ inches, the fractional part of an inch representing the amount of which the median line of a yard of stretched casing exceeds the median line of a yard of casing, unstretched. In practice, it is generally inadvisable to stretch the casing quite to the rectilinear form on account of the risk of breakage of the delicate membrane constituting the casing, and the compensating fraction should include the slight error arising from the incomplete stretching.

The casing is lifted from the friction surface 14 of the measuring element by means of a jet or jets of fluid under pressure emanating from a series of apertures 29 in the end of a pipe 30, which is supported by the frame of the measuring device and extends beneath the measuring element 13 in close adjacency to the surface thereof. A cock 31 (Fig. 1) controls the supply of fluid pressure.

It will be understood that various changes may be made in the form and relation of parts to suit different requirements of use, and that the invention, therefore, is not limited to the precise details of construction and arrangement shown.

Having described my invention what I claim as new and desire to secure by Letters Patent, is:—

1. A device for the linear measurement of flat elastic strips of sausage casing, the same being normally laterally curved in the plane of its width, comprising an independently driven rotatable measuring element which said strip adhesively engages and applicable by its rotation to successive portions of said strip for measuring the same, tensioning means engageable with said strip, said tensioning means and measuring element being so relatively positioned as to cause the strip to cling to a definite area of the surface of said measuring element so proportioned that the frictional pull of said measuring element is in excess of the resistance of the tensioning element by an amount, sufficient to stretch the strip to temporarily lessen its lateral curvature.

2. A device for the linear measurement of an elastic flat strip which has a set lateral curvature in the plane of its width, in terms of a longitudinal line running through said strip intermediate the curved sides thereof, comprising a measuring element applicable to successive portions of said strip, and tensioning means cooperating with said measuring element for stretching that part of the unmeasured portion of said strip lying between said measuring element and said tensioning means sufficiently to temporarily lessen the degree of said lateral curvature, said measuring element having a measuring surface equal in length to a standard unit of measurement, altered by an amount sufficent to compensate for the difference in length between the measured unit of the stretched strip and the length of said intermediate longitudinal line through the same unit of the strip when unstretched.

In testimony whereof I have hereunto set my hand.

WILLIAM MILLER.